Sept. 17, 1974　　　B. S. FERRIS　　　3,836,624
METHOD OF PRODUCING THREE-DIMENSIONAL FOAM PLASTIC FORMS
Filed Nov. 6, 1972
Fig. 1.
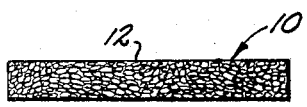
Fig. 2.
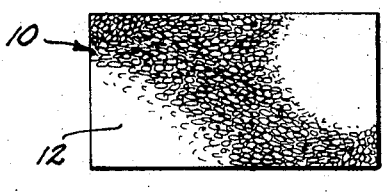
Fig. 3.
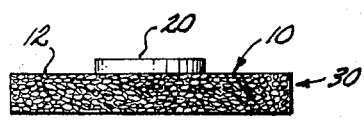
Fig. 4.
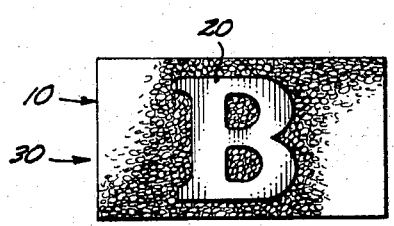
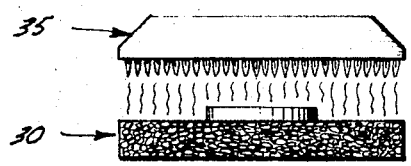
Fig. 5.
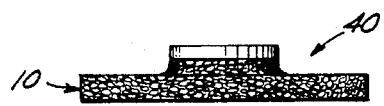
Fig. 6.
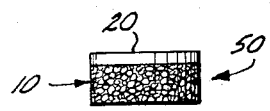
Fig. 7.
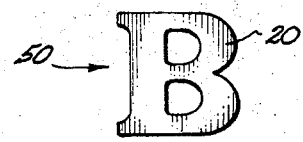
Fig. 8.
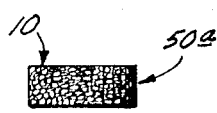
Fig. 9.
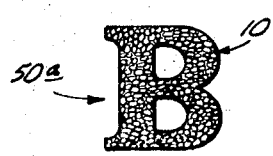
Fig. 10

3,836,624
METHOD OF PRODUCING THREE-DIMENSIONAL FOAM PLASTIC FORMS

Byron S. Ferris, 3264 SW. Evergreen Terrace, Portland, Oreg. 97201
Filed Nov. 6, 1972, Ser. No. 303,805
Int. Cl. B29d 27/100
U.S. Cl. 264—321                          5 Claims

ABSTRACT OF THE DISCLOSURE

A method for producing three-dimensional forms of foam plastic wherein a heat-resistant mask is applied to a surface of a heat-collapsible foam body, and the mask-bearing body is exposed to a spaced source of heat energy for a time sufficient to collapse the unmasked areas of the foam.

BACKGROUND OF THE INVENTION (1) Field of the Invention

This invention relates generally to a method for producing three-dimensional forms of foam plastic, and more particularly, to a method for producing such forms by the image-wise collapse of a heat-collapsible plastic foam.

(2) Description of the Prior Art

Known methods for producing three-dimensional forms or objects of foam plastic include well-known mechanical operations such as sawing, die cutting, and hot wire cutting. Foam plastic objects have also been produced by collapsing localized areas of a plastic foam block using a suitably shaped heated die. These prior art methods have many drawbacks. For instance, conventional sawing and cutting procedures are best suited for making small quantities of objects having relatively simple outlines. And while production methods using dies, either for cutting or for heat collapsing, better adapt themselves to quantity production, new dies must be made for any change in shape or design. As will be appreciated, such dies are quite costly, particularly if complex or intricate designs are required.

It would be desirable, therefore, to have a method whereby three-dimensional foam plastic forms could be produced in quantity at low cost, and whereby the design of the forms could be changed readily without great expense.

SUMMARY OF THE INVENTION

According to the present invention, a method is described for producing three-dimensional foam plastic forms or objects by the image-wise collapse of a heat-collapsible plastic foam. More particularly, such forms are produced by applying a heat-resistant mask to a surface of a suitable plastic foam body, then exposing the mask-bearing surface to a source of heat energy to at least partially collapse the foam in the unmasked areas of the surface.

The heat-resistant mask may, for example, be cut from a thin sheet of metal or other heat resistant material, but the preferred method is to print the mask directly on the foam body using a heat-resistant paint or ink.

After the heat-resistant mask has been applied, the surface is exposed to a spaced, high temperature heat source. By controlling this exposure to effect only partialy collapse of the foam in the unmasked areas, a relief is produced. Increasing the exposure to produce total collapse in the unmasked areas results in a three-dimensional foam plastic form having an outline identical to that of the heat-resistant mask.

The three-dimensional forms produced by the method just described have utility as decorative items. Produced in the shape of letters, numbers or other typographic elements, the forms have particular utility in making signs. For example, foam plastic letterforms are attached in a desired array to a painted metal panel. After overspraying the panel with paint of a contrasting color, the forms are removed to yield a permanent painted sign. Less permanent, three-dimensional signs may be produced by simply adhering the foam letterforms to a base panel.

The three-dimensional products of the invention also may be used as image-transfer media. For example, the raised or image areas of a foam plastic relief produced by a controlled heat exposure may be coated with a transferable material such as ink, and contacted with a receiving surface to transfer the image. Alternatively, individual three-dimensional forms of a desired design may be attached to a support to provide a low cost letterpress printing plate.

DESCRIPTION OF THE PREFERRED EMBODIMENT

The heat-collapsible plastic foam used in the practice of the invention may be any foamed or expanded polymeric material which substantially collapses upon exposure to a high temperature heat energy source, such as, for example, expanded polystyrene compositions. In a preferred practice of the invention, foam sheets having at least one smooth surface and a thickness of about 0.062 to about 0.25 inches are used to produce three-dimensional letterforms. An expanded polystyrene egg carton sheet, supplied by Dolco Packaging Corporation, having a nominal thickness of 0.10 inches and a density of about 5.9 lb./ft.$^2$ has been used with good success.

As previously mentioned, the heat-resistant mask or masking image preferably is printed on the sheet using, for example, conventional screen process methods. Such methods combine the advantages of low cost quantity reproduction and the capability of applying images having essentially any desired shape or outline through the use of well-known photographic reproduction techniques. In addition, masking images may be changed readily without great expense.

Although the ink or paint used in printing the masks is not critical, it should be one having a solvent carrier compatible with the foam plastic used, i.e., one which does not attack the plastic. Screen process paints having an aluminum pigment base have been found to be particularly suitable. For best results, particularly when darker-colored inks or paints are used, the applied image should be relatively thick, with well-defined edges.

After printing the heat-resistant mask on the smooth surface of the foam, the sheet is passed under a high temperature heat source, such as an elongate gas burner or "flame jet," spaced at a distance above the sheet. Heat from the source causes the unprotected areas of the foam to collapse. When using a flame jet, it has been found preferable to adjust the burner so that the flame just "brushes" the surface of the foam sheet passing beneath it, controlling exposure time to produce the desired degree of collapse.

The preferred polystyrene material collapses readily, leaving little or no residue, upon exposure to the heat source. It is thought that the material is melted and at least partially vaporized by the intense heat of the flame. In any even, well-defined three-dimensional forms result.

The invention can be further illustrated by reference to the accompanying drawings wherein:

FIGS. 1 and 2 are cross section and top plan views, respectively, of a heat-collapsible plastic foam sheet.

FIGS. 3 and 4 are cross section and top plan views, respectively, illustrating the foam sheet shown in FIGS. 1 and 2 after the application of a heat-resistant mask.

FIG. 5 schematically represents the exposure of the mask-bearing sheet of FIG. 3 to a spaced high temperature heat source.

FIG. 6 illustrates in cross section view a relief structure produced by partial collapse of the unmasked areas by the heat exposure of FIG. 5.

FIGS. 7 and 8 are cross section and top plan views, respectively, illustrating a three-dimensional form produced by complete collapse of the unmasked areas by the heat exposure of FIG. 5.

FIGS. 9 and 10 are similar views illustrating the result of removing the heat-resistant mask from the forms of FIGS. 7 and 8, respectively.

FIGS. 1 and 2 show a heat-collapsible foam plastic body 10 of a suitable material such as an expanded polystyrene composition. Body 10 preferably has a smooth top surface 12. Next, FIGS. 3 and 4, a heat-resistant mask 20 is applied, as by printing, to surface 12, forming mask-bearing sheet 30.

After the mask has been applied, the sheet 30 is exposed (FIG. 5) to a source 35 of heat energy spaced at a distance above the sheet. Source 35 may, for instance, comprise an elongate gas burner, or any suitable high temperature radiant heat source. Sheet 30 is exposed by passing the sheet beneath the burner at a rate which produces the desired degree of collapse in the unmasked areas of body 10.

If controlled to produce partial collapse of the unmasked foam, a relief structure 40 (FIG. 6) results. For production of such relief structures, body 10 preferably should have a thickness of at least about 0.25 inches. With thinner sheets, as will be appreciated, production of a well-defined relief structure is difficult.

FIGS. 7 and 8 depict a three-dimensional form 50 produced by complete collapse of the unmasked areas of sheet 30. FIGS. 9 and 10 show three-dimensional forms 50a resulting from the removal of mask 20 from form 50. The removal of mask 20 is generally unnecessary when a printed mask is employed in the practice of the invention. Moreover, since the ink or paint used to print the mask tends to seal the porous foam surface, leaving it in place may prove advantageous.

Although the invention has been described with reference to certain preferred embodiments thereof, it will be understood that variations and modifications can be effected without departing from the spirit and scope of the invention as described above and as defined in the appended claims.

I claim:
1. A method for producing a three-dimensional replica of a two-dimensional design, comprising
   (a) providing a thin sheet of polystyrene foam having at least one smooth surface,
   (b) printing a mask in the shape of said design on said surface using a heat resistant ink, and
   (c) exposing the mask-bearing surface to heat energy from a high temperature source spaced at a distance from said surface for a time sufficient to produce substantially complete collapse and dissipation of the foam in the unmasked areas, whereby a three-dimensional foam plastic replica of said design is produced.

2. The method of claim 1, wherein said polystyrene foam sheet has a thickness of about 0.06 inches to about 0.25 inches.

3. The method of claim 1, wherein said high temperature heat source comprises a gas flame.

4. A method for producing a three-dimensional foam plastic replica having the outline of a two-dimensional design, comprising
   (a) providing a sheet of polystyrene foam having a thickness of about 0.06 inches to about 0.25 inches, and having at least one smooth surface,
   (b) printing a heat-resistant mask in the shape of said design on said surface using a heat resistant ink, and
   (c) exposing the mask-bearing surface to a high temperature flame source spaced at a distance from said surface for a time sufficient to produce substantially complete collapse and dissipation of the unmasked areas of the sheet, whereby a three-dimensional foam plastic replica having the outline of said design is produced.

5. The method of claim 4, wherein said design has the outline of a typographic element.

References Cited
UNITED STATES PATENTS

| | | | |
|---|---|---|---|
| 3,170,008 | 2/1965 | Levine | 264—293 |
| 3,454,413 | 7/1969 | Miller | 264—321 |
| 2,722,719 | 11/1955 | Altstadter | 264—321 |
| 2,914,109 | 11/1959 | Hsu et al. | 264—321 |
| 3,549,733 | 12/1970 | Caddell | 264—80 |

MAURICE J. WELSH, Primary Examiner

E. C. RZUCIDLO, Assistant Examiner

U.S. Cl. X.R.

101—426; 264—52, 80, 293